US008869083B1

(12) United States Patent
Morgana et al.

(10) Patent No.: US 8,869,083 B1
(45) Date of Patent: Oct. 21, 2014

(54) DYNAMIC BRIDGE GENERATION IN PACKAGE DEFINITION SYSTEMS

(71) Applicant: Xerox Corporation, Norwalk, CT (US)

(72) Inventors: Stephen C. Morgana, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/904,377

(22) Filed: May 29, 2013

(51) Int. Cl.
  *G06F 17/50* (2006.01)
(52) U.S. Cl.
  CPC .................. *G06F 17/5068* (2013.01)
  USPC ......................................... 716/110
(58) Field of Classification Search
  CPC .................. G06F 17/30; G06F 17/50
  USPC ......................................... 716/110
  See application file for complete search history.

(56) References Cited

U.S. PATENT DOCUMENTS

| 7,941,465 | B2 | 5/2011 | Gombert et al. |
| 8,160,992 | B2 | 4/2012 | Gombert et al. |
| 8,170,709 | B2 | 5/2012 | Puissant |
| 2010/0058943 | A1 | 3/2010 | Bober |
| 2011/0052888 | A1 | 3/2011 | Eschbach et al. |
| 2011/0116133 | A1 | 5/2011 | Walker et al. |
| 2011/0149337 | A1 | 6/2011 | Goetz et al. |
| 2014/0038801 | A1* | 2/2014 | Morgana et al. ............ 493/1 |
| 2014/0038802 | A1* | 2/2014 | Clark et al. ............... 493/11 |
| 2014/0040319 | A1* | 2/2014 | Morgana et al. ........... 707/803 |
| 2014/0121800 | A1 | 5/2014 | Morgana et al. |
| 2014/0129018 | A1 | 5/2014 | Morgana et al. |
| 2014/0139849 | A1 | 5/2014 | Eschbach et al. |

* cited by examiner

Primary Examiner — Vuthe Siek
Assistant Examiner — Mohammed Alam
(74) Attorney, Agent, or Firm — Fox Rothschild LLP (57) ABSTRACT

A package generation system creates and/or uses a package design file to determine where to apply cut lines and crease lines to a two-dimensional substrate so that the substrate may be formed into a three-dimensional package. Some of the cut lines may correspond to package edges, and the system dynamically determines where to include bridges in the cut lines to hold the package in place and prevent the package from separating from the substrate before the package creation process is complete.

20 Claims, 7 Drawing Sheets

DYNAMIC BRIDGE GENERATION IN PACKAGE DEFINITION SYSTEMS

BACKGROUND

Certain package creation systems may use a package definition file to define and create a package from a flat substrate. The package definition file may contain data representing where cut lines and crease lines will be imparted upon a substrate to yield a package flat that may be folded into the three-dimensional package. In the personalized packaging situation, the dimensions and/or positions of such lines will need to vary from package to package.

When the package is actually created using machinery such as a cutter, the substrate may be subject to tension and forces that will bend the substrate as the substrate moves through the cutter. If portions of the package separate from the substrate while the substrate is still in the machine, the substrate and package may bind and get stuck on the machine. Accordingly, package designers may apply bridges, or small pieces of material that secure the package to the substrate during production but which are easy to separate as soon as production is complete.

If a package flat includes too many bridges, it will be difficult to separate the package from the substrate after production. If the package flat does not include enough bridges, the package may prematurely separate from the substrate and jam the production machine.

This document describes systems and methods that help to avoid the issues above in the package generation process.

SUMMARY

In an embodiment, a package generation system includes a cutting device, a processor and a data storage facility. The data storage facility may contain a package design file that is created and/or accessed by the system The package design file includes a two-dimensional representation of a three-dimensional structure having multiple facets, along with a set of rules that define edges for the three-dimensional structure. Each edge represents a line along which the three-dimensional structure will be separated from a two dimensional substrate after cut lines and fold lines are applied to the substrate. The rules also identify facets that are functional elements of the structure, wherein each functional element facet has at least one of the cut line edges.

The system also may include a non-transitory computer-readable medium containing programming instructions. Upon execution, the instructions may instruct the processor to access the package design file and apply one or more of the rules of the package design file to identify an orientation pursuant to which the substrate will pass through the package generation system. Based on the orientation, the processor will identify a location along a cut line edge that will receive a bridge, and the processor will cause the cutting device to apply a cut line with the bridge to the substrate at the identified location.

The system also may include a creasing device. If so, the package design file may include rules that define locations for fold lines for the substrate, and the programming instructions also may be configured to instruct the processor to access the package design file and apply one or more of the rules of the package design file to cause the creasing device to apply the fold lines to the substrate at the defined locations for the fold lines.

In some embodiments, the instructions that are configured to instruct the processor to identify an orientation pursuant to which the substrate will pass through the package generation system may include instructions to identify a leading edge or a trailing edge of the substrate based on a dominant direction of travel of the substrate within the package generation system. The instructions that are configured to instruct the processor to identify a location along a cut line edge that will receive a bridge may include instructions to identify a cut line that is a convex cut line. The instructions to identify a cut line that is a convex cut line may include instructions to identify a first facet having a plurality of edges positioned in a plurality of orientations, and to identify as the convex cut line a portion of one of the first facet's edges that, if no bridge were installed, would be likely to separate from the substrate when the substrate travels within the system in a direction that is opposite the dominant direction of travel.

The instructions to identify the location along a cut line that will receive a bridge may include instructions to identify a location of the cut line that is closest to the leading edge or furthest from the trailing edge, and to determine whether the location is an end of the cut line. If the location is not an end of the cut line, the system may assign the bridge to the location. Alternatively, if the location is an end of the cut line, the system may determine a distance from the end and assign the bridge to a position that is the determined distance from the end.

The instructions to identify the one or more locations along a cut line that will receive a bridge may include instructions to determine whether the line has a curvature with a deviation that exceeds a threshold. If the deviation does not exceed the threshold, the system may assign the bridge to a position along the cut line that is closest to the leading edge. Alternatively, if the deviation exceeds the threshold, the system may assign a plurality of bridges to positions along the cut line that are closer to the trailing edge than to the leading edge.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

A "package generation system" is a machine or group of machines that combines the features of a print device with one or more tools for imparting a cut, crease, and/or perforation on a printed substrate so that the substrate may be folded into a three-dimensional package, or other folds or structures.

A "package flat" refers to a generally two-dimensional structure having two or more facets formed in a substrate by cut lines (including perforations) and/or fold lines (including creases and/or score lines). The package flat also may include printed content on one or more of the facets. The flat may be removed from the substrate at the cut lines, and the flat may then be folded into a three-dimensional structure having two or more sides.

In this document, a "bridge" refers to a structure that connects a facet (or portion of a facet) of a package flat to the substrate from which the flat will be removed before it is folded into a three-dimensional package, or to some other facet that it will not be connected to in the final assembly.

Package production may be performed by a package generation system that is capable of performing printing operations on, and applying creases and cuts to, a substrate. The system also may perform other actions such as coating and/or stacking the substrate. Examples of automated package generation systems include those in the iGen® series of digital production printing presses, available from Xerox Corporation, in connection with corresponding finishing devices. Other systems may include smaller printing devices, such as a Xerox DocuColor® 250, or a digital cutter as offered by a variety of manufacturers.

One aspect in the creation of a package is that the printing device operates on a two dimensional sheet—i.e., a package flat. The actual three-dimensional shape of the package is subsequently created by folding and connecting the facets that make up the flat. Here it is understood that various types of folds may create a three-dimensional structure or shape in the language of this application. This imposes a variety of restrictions on the structure both in its two dimensional form, as well as in its three dimensional form. The substrate is typically a paper material, such as cardstock, cardboard, or paper having sufficient thickness to provide structural support when folded into a three-dimensional shape.

Figure 1:
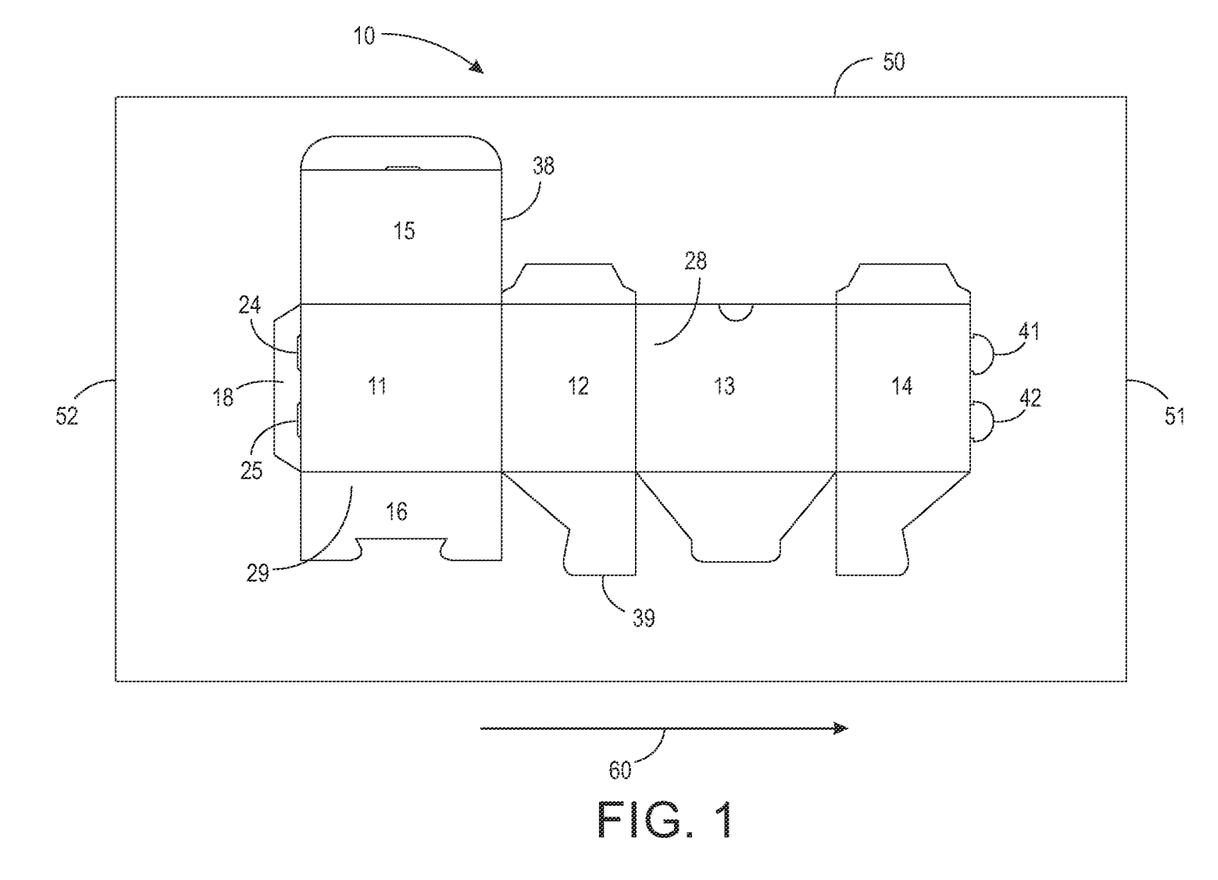
FIG. 1 depicts an example of a two-dimensional package flat.

FIG. 1 shows an example of a package flat 10 that may be formed into a three-dimensional package. This package flat 10, in this case a rectangular box, includes a variety of faces 11-16. Faces 11-14 may be considered sides, while faces 15 and 16 may be considered to be the top and bottom lids of the package. Each of the faces may be considered to be an exterior-facing facet, or a structural element of the final package. Note that some faces might actually include multiple facets. Facets also may include various functional elements that provide a connecting or other structural function for other elements of the package. Functional elements may include folds, lids, lips, tabs, flaps, receptacles, or other structures that either extend into or are received by a face or a corresponding functional element. Examples shown in FIG. 1 include locking tabs 41, 42 and a corresponding flap 18 with slots 24, 25 that receive the tabs when the package is folded. Similarly, flap corresponding to line 39 contains a protruding structure that is received by face 16 (which serves as both a face and a functional element) when the box is folded into a three-dimensional structure. In the example shown in FIG. 1, most of the facets—including several of the faces—also serve as functional elements for the structure.

The outer edges of the package flat will be separated from the substrate because various cut lines will be imparted on the substrate at locations that correspond to the outer edges of the package. Examples include lines 38 and 39 which form edges of the package. Crease lines also may be imparted to connect various facets via a line that is scored or impressed to encourage folding. Examples include a crease line 29 that will enable facet 16 to be folded toward facet 11, and crease line 28 that will serve to form a fold line that will enable facet 12 to be folded toward facet 13. These creases might be implemented in a variety of different ways as a function of hardware capability and fold properties. As shown, crease line 29 is formed as a standard crease line or kiss cut. Other crease lines may be formed as a perforation line, where each perforation line includes perforation cut segments, with spacers of uncut substrate positioned between the perforation cut segments and/or the end of the perforation line.

A package generation system may access or generate a package design file that contains instructions for imparting creases and cut lines on a substrate to form a package flat. The file may contain location and size information for such portions of the package flat. The package design file may be created by any suitable package design process. Examples of such processes are disclosed in U.S. Pat. Nos. 7,941,465 and 8,160,992; and U.S. patent application Ser. Nos. 13/563,071; 13/669,826; and Ser. No. 13/683,249, the disclosures of which are each incorporated by reference in their entirety.

When the cut lines are imparted into a substrate, the structure must include various bridges to hold the package cut-out securely inside of the substrate until all crease lines and cut lines have been applied, to the substrate. A bridge is a solid piece of substrate that temporarily secures the package flat to the remaining portion of the substrate from which the package flat will be removed. A bridge may typically be smaller than a perforation spacer, although this is not a requirement. A bridge may be, for example, between 0.1 and 0.2 mm wide. Other sizes are possible. The bridges ensure that when the substrate moves throughout the package generation machine, and especially when the substrate bends as it moves along various rollers, the package flat will not separate from the substrate. However, the bridges must be sufficiently small in size and low in number to allow the package flat to be removed easily from the substrate after printing, creasing and cutting are complete.

When one looks at the examples of FIG. 1, it is apparent that most of the edges are defined by functional elements. Very few of the edges are defined by a face. Thus, a package design file must include instructions to create bridges along many or all of the edges. In a simple system where package design files are manually created (or even automatically created), the creator or system could introduce bridges on a periodic basis, such as one bridge every X millimeters in length along each edge. However, in a dynamic package generation system, where the system automatically creates a package design file based on user specification of facet size, shape and interrelation, the same number and/or spacing of bridges may not be ideal. If there are too few bridges, or if the bridges are in the wrong locations, then the package flat may separate from the substrate before it is fully formed in the package generation system. If there are too many bridges, the package flat may be difficult to remove without tearing the substrate, the package flat or both.

In the system of the present disclosure, the system creates a package design file with the goal of reducing or minimizing the number of bridges used, while still including enough bridges to hold the package flat in place in its formative substrate while package generation system creates the package flat. To do this, the system may identify an orientation of the substrate. The orientation may be obtained from data included in the package design file, from data received from a user input or other source, or as a default orientation. The orientation allows the system to know how the substrate will pass through one or more cutting devices of the package generation system. For example, referring to FIG. 1, if the orientation data indicates that substrate 50 includes a leading edge 51 and/or a trailing edge 52, the system may know that the orientation of the substrate 50 as it passes through the system will follow arrow 60. In this situation, leading edge 51 will be the first edge of the substrate that enters the system, and trailing edge 52 will be the last edge of the substrate the enters the system. Other methods of identifying the orientation of the substrate may be used.

Figure 2A:
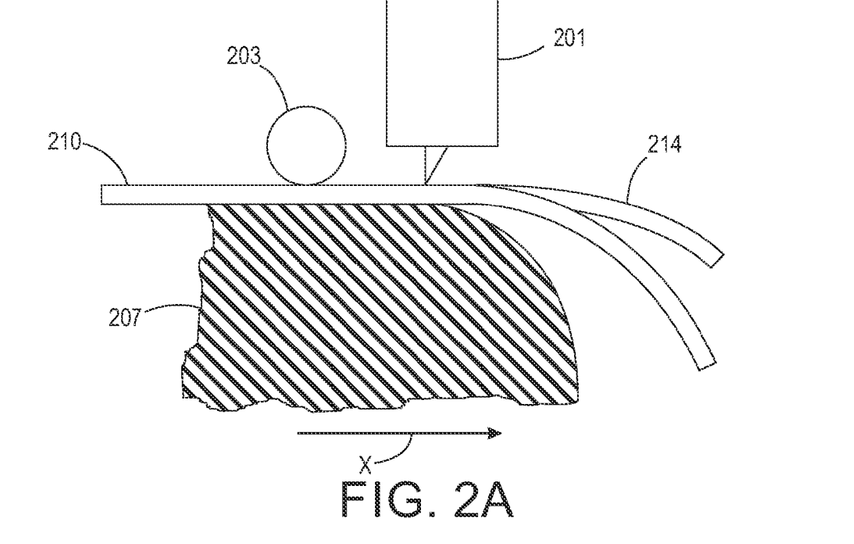
FIGS. 2A and 2B illustrate possible reactions of a cut line of a substrate as the substrate moves within a package generation system.
Figure 2B:
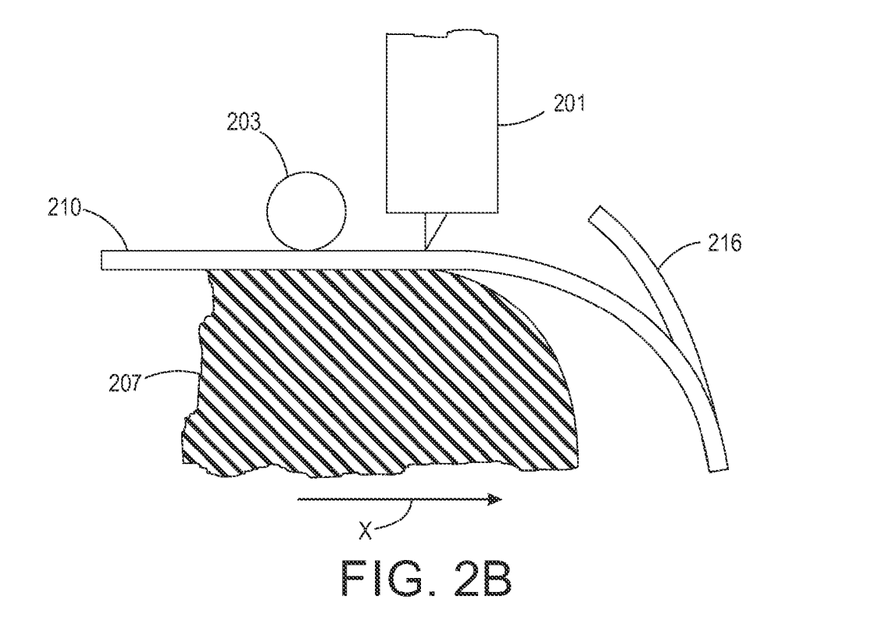

In addition, the system may identify a curvature property for each cut line—i.e., whether the cut line will be a convex cut or a concave cut. The terms "convex" and "concave" as used here do not refer to any structural differences between the cuts themselves, but rather to the behavior of the substrate at the location of the cut when the substrate is moved through the cutting system. This is illustrated by FIGS. 2A and 2B, which each show a substrate 210 within elements of a cutting machine including a cutting head 201, roller 203 and base or support 207. The orientation of the substrate 210 in FIGS. 2A and 2B is such that it is fed into the system from a feeder on the left side of the figure, and exits the system toward an output tray that is positioned to the right of the figure, as shown by the arrow on the x-axis. However, during processing the direction of movement of the paper may be bi-directional, for example the substrate may reverse direction along the x-axis. A convex cut is one that, unless a bridge is installed, would be likely to open when the substrate travels within the system in a direction that is opposite the dominant direction of travel. This will be described in more detail below.

In addition, a cutting system may include a cutting head 201 that moves along one axis. In the example of FIG. 2B, the cutting head 201 may move along the y-axis, which would point into the figure. For cuts that are applied along the y-axis, when the direction of the substrate 210 is reversed and pulled back toward the feeder it may exhibit the characteristics of FIG. 2A if the cut is concave and the characteristics of FIG. 2B if the cut is convex. Specifically, as illustrated in FIG. 2A, a concave cut will close when the sheet 210 is moved to the left. The protruding portion 214 of the sheet (i.e., that between the cut and the leading edge of the substrate) may be essentially flat with the rest of sheet 210 so that the sheet remains intact and the cut closes. In contrast, as illustrated in FIG. 2B, if the cut is convex then the protruding portion 216 of the sheet that is between the cutting head and the leading edge of the substrate may maintain its separation from sheet 210 when the sheet moves left and protruding part 216 may have a high likelihood of interfering with head 201 or another physical structure. This may cause the machine to jam if separation occurs before the package creation is complete. Thus, in the situations shown in FIGS. 2A and 2B, additional protection in the form of bridges may be needed for convex cuts as such cuts may open when the substrate reverses direction, but concave cuts may require little or no bridging.

Figure 3:
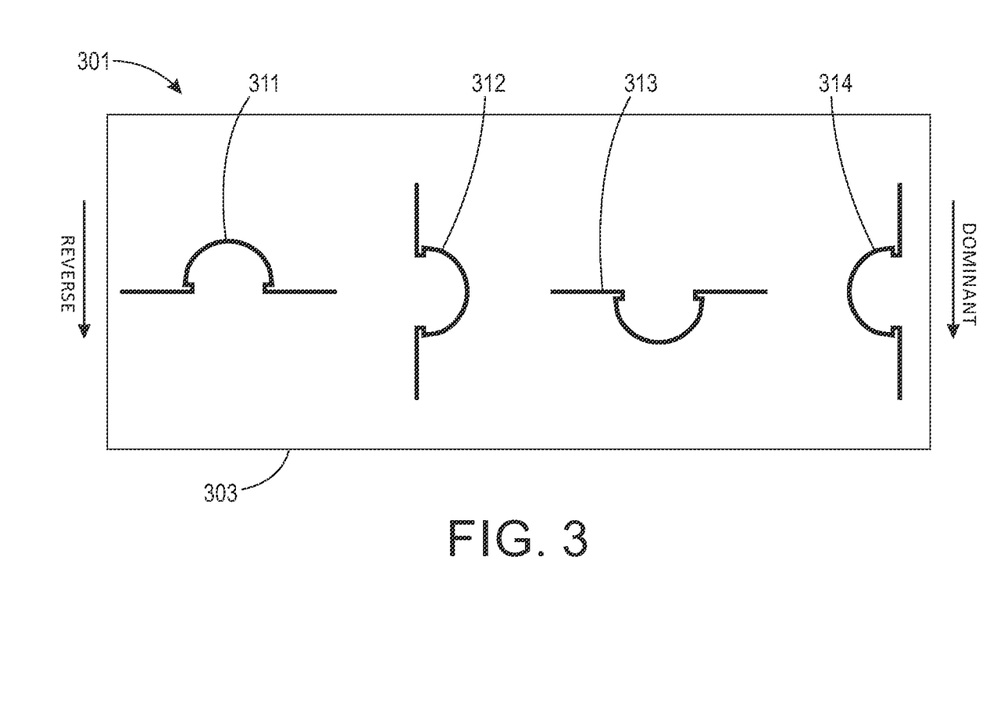
FIG. 3 is an illustration showing different orientations of a functional element's edge with respect to the edge's corresponding substrate.

FIG. 3 illustrates an example functional element (a locking tab) on a substrate 301, with four different orientations 311-314 of the tab with respect to the substrate's leading edge 303. The leading edge and corresponding trailing edge may thus be selected based on which direction of travel is dominant (i.e., enters the system first) when the substrate is being processed by the package generation system. Thus, in FIG. 3 and in the following, the leading edge is at the bottom and the dominant direction of travel is from top to bottom. Since the substrate will locally also move in the reverse direction (to the left for the case of FIG. 2) this reverse direction is the direction of concern, thus determining concave and convex designations. A cut having an arc, angle or other feature that protrudes or points toward a trailing edge of the substrate may be considered convex, as it may result in separation during travel in the reverse direction of a bridge is not installed on that cut.

For example, when a substrate 300 of FIG. 3 containing the four tabs enters the system, tab 313 will exhibit the effect of shown in FIG. 2A as the substrate moves in the dominant direction of travel. When the substrate 300 reverses direction, tab 311 includes an arc with a radius pointing away from the leading edge and toward the trailing edge, and this will exhibit the effect shown in FIG. 2B. Thus, the leftmost tab 311 may require bridging, as its rounded edge will be formed by a convex cut line that may open when the direction of travel is reversed. In contrast, tab 313 has an opposite orientation and a rounded edge with a concave cut line having a radius pointing toward the leading edge, and thus may require little or no bridging. To determine which edges of each tab require bridges, the system may also consider that if a bridge is placed at a corner of any tab, there is a risk of tearing because in this structure each corner is very close to other corners of the tab.

Figure 4:
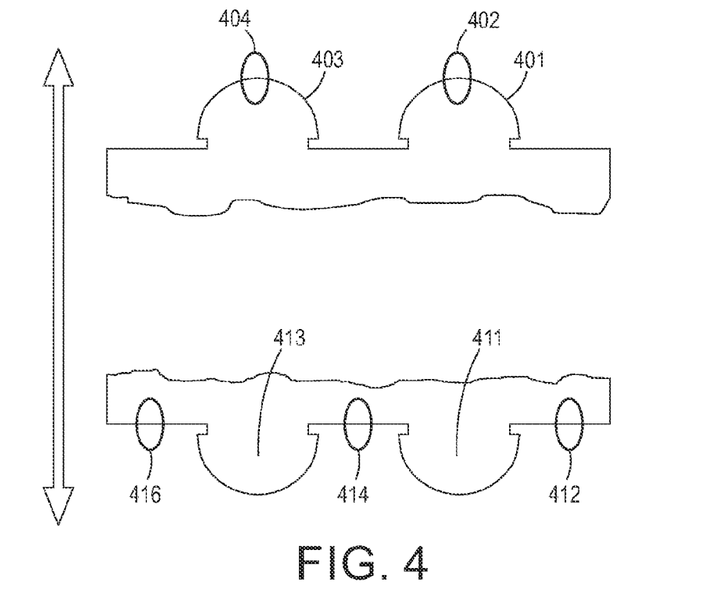
FIG. 4 illustrates an example of how bridges may be assigned to a first set of functional elements according to an embodiment.

FIG. 4 illustrates how the system may assign bridges based on the orientation of the substrate and the character of the cut line. In FIG. 4, the rounded edges of tabs 401 and 403 form convex lines and thus require bridges 402, 404 at their apex—i.e., the points at which the edges 401 and 403 are closest to the leading edge of the substrate during reverse travel. In contrast, the rounded edges of tabs 411 and 413 form concave lines and thus are not expected to separate during processing, but the edges of the spaces between tabs 411 and 413 may form convex lines and thus each require a bridge 412, 414, 416.

Figure 5:
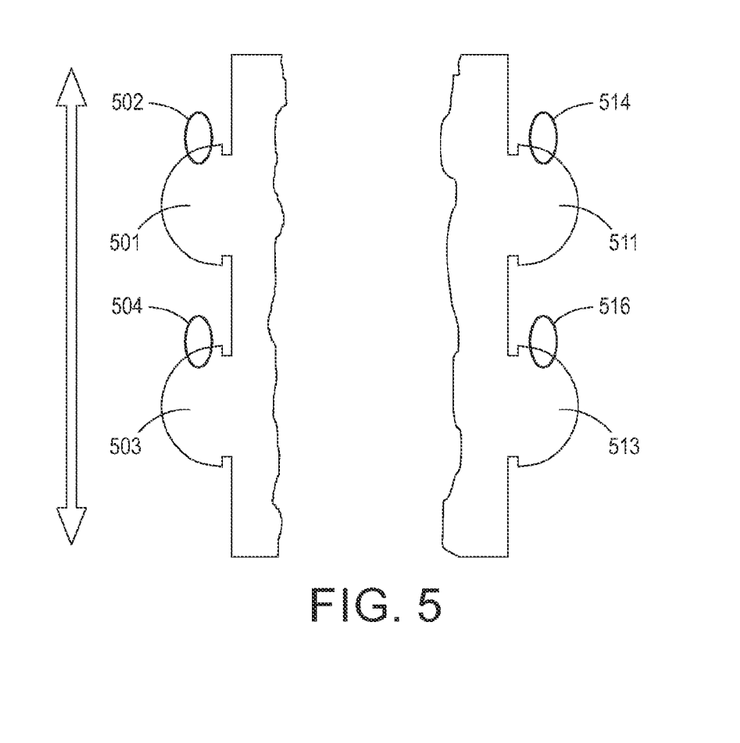
FIG. 5 illustrates an example of how bridges may be assigned to the first set of functional elements when they are positioned with a different orientation than that of FIG. 4 according to an embodiment.

FIG. 5 illustrates how bridges may be applied to similar functional element tabs where the substrate has a different orientation, in this case a 90° rotation with respect to the orientation of FIG. 4. In this situation, the bridge location is along a convex portion of each of cut line for tabs 501, 503, 511 and 513 is a portion 502, 504, 514 and 516 of the rounded edge that is closest to the leading edge of the substrate. While the corner of the cut line may be the closest point to the leading edge, the system may apply a rule to keep the bridge at least a threshold distance away from a corner to avoid tearing. This illustrates that the system may apply rules to apply a bridge at the highest point of a convex area—i.e., the point that is closest to the leading edge of the substrate during reverse travel—that is also at least a threshold distance away from any sharp angle—i.e., a corner—of one or more cut lines. Other rules—such as rules requiring that if a convex line is at least a threshold size then it should include a bridge for every specified unit of distance of the line, may be applied.

Figure 6:
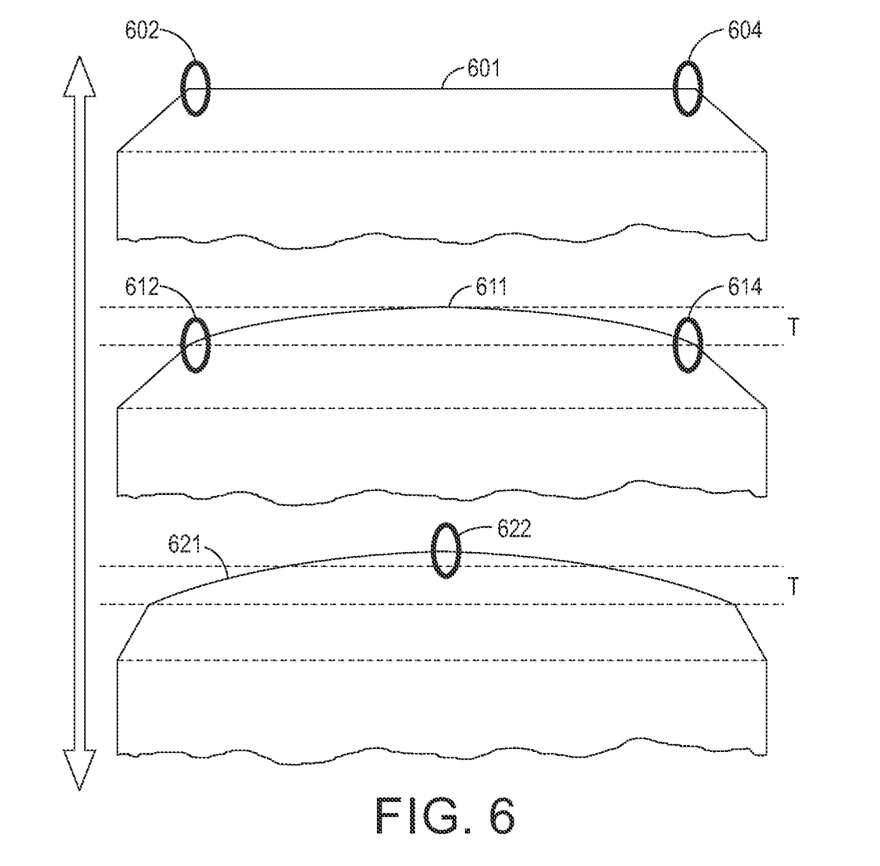
FIG. 6 illustrates an example of how a system may determine a number and location of bridges to apply.

In some situations, such as straight-line edge cuts that are parallel to the leading edge of the substrate, the system may not be able to define a highest convex point on the edge. An example of this is shown in FIG. 6, where edge 601 is a straight line that is parallel to the leading edge of its substrate. Thus, no "highest" convex point can be defined. In this situation, the system may apply any suitable set of rules to determine the number and location of the bridges. For example, if the edge 601 is no more than a threshold length, or if a ratio of the cut edge length 601 to the leading edge length is less than a threshold, then the system may apply only one bridge at the center of edge 601. However, as the size of edge 602 increases, the number of bridges may increase with each step or threshold of size. For example, the size of edge 601 may warrant two bridges 602, 604. If so, the rules may specify that each bridge be positioned a specified distance (or relative portion of the edge distance) away from each end of the line.

In the second example of FIG. 6, edge 611 has a curvature that is less than or equal to a threshold T size deviation. The deviation may be that which is along an axis that is parallel to the direction of movement of the substrate in the package generation device. In such a situation, so long as the size of the deviation is less than or equal to T, the system may apply a rule to apply multiple bridges 612, 614 along the curvature of the edge, including a bridge at a location that is a specified distance x away from each end of the curvature of edge 611. Conversely, if the edge 621 has a curvature that is greater than the threshold T size deviation, then the system may apply a bridge 622 at the highest point of the edge—i.e., the point that is closest to the leading edge of the substrate.

Figure 7:
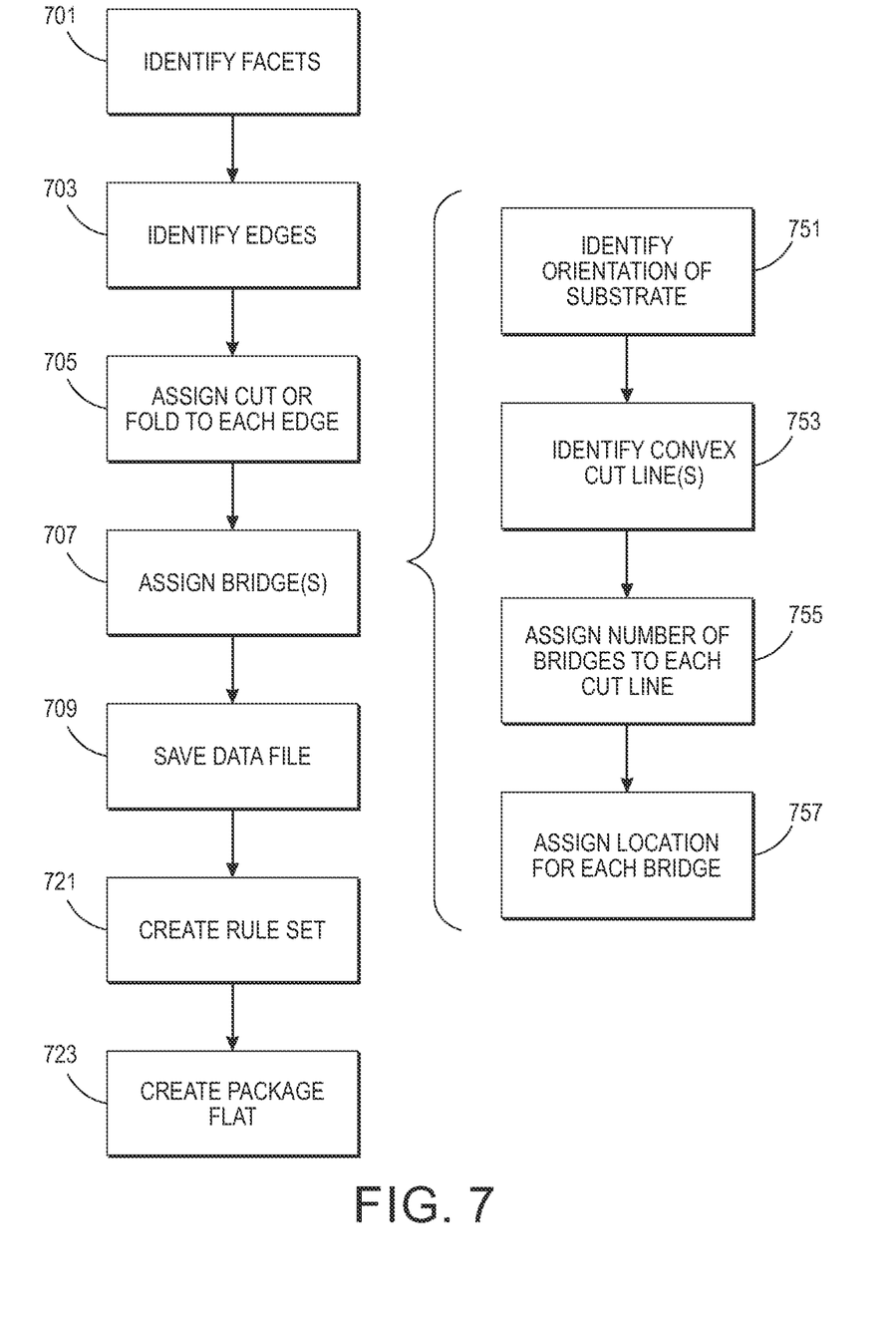
FIG. 7 is flowchart illustrating several example steps assigning bridges in a package design process.

FIG. 7 is a flowchart illustrating various steps that a package design system may implement when creating a package design file. The file may include a graph representation of a three-dimensional package. The system may identify a set of facets for the package 701. Initially, each facet may be a face which will include a set of edges. For each edge, the system may identify a connecting relationship between the edge's facet and a different one of the faces 703. The system also may determine whether each edge is to be applied as a cut line or a fold line 705. The system may then save the graph representation to a memory as a data file 709.

Optionally, the system may access the data file and specify a number and location for one or more bridges 707 to be applied along one or more of the cut lines. Alternatively, the number and location of the bridges may be identified during the initial generation of the data file.

The system will then create a package generation rule set 721 that includes the dimensions and structural parameters for each of the facets, along with the type of line (cut or fold) for each edge of each facet. The rule set may include, for example, a set of cutting and/or scoring instructions that a package generating device may use to apply cut lines and/or fold lines to a substrate. The rule set also may include a set of rules for a number and location of one or more bridges to apply to the substrate to hold the package flat in place during production. The instructions may be saved to a computer readable memory such as a package generation file. The system may do this by retrieving a group of instructions for the edges of each facet from an instruction database, modifying groups as necessary based on each facet's relative position in the package, and then combining each retrieved group into an overall instruction set for the package flat. The system may then use a package generation system to apply the package generation rule set by imparting cut lines and fold lines to a substrate to yield a package flat 723.

FIG. 7 also illustrates various steps that the system may take when identifying a number and locations of bridges to include in the package design file. As described above, the system may identify an orientation 751 of the substrate as it will move through the package generation system. It may do this by receiving data that identifies a leading edge and/or trailing edge of the substrate as it will enter the system. Other methods of identifying the orientation may be used. The system will then identify one or more of the cut lines as convex cut lines 753—i.e., lines that are likely to separate and open during package production if bridges are not applied to secure the package flat to the substrate at some point along the cut line. The system will apply one or more rules to determine a number 755 and location 757 of one or more bridges to apply to the convex cut line. In an example implementation, assuming a paper (substrate) weight of approximately 300 gr/m$^2$, all convex cuts would be protected by a bridge and all non/convex areas would get a bridge every 36 mm, acknowledging that the bridge separation in non-critical/non-convex areas is influenced by the paper weight. Any other suitable rules may be used, such as those described above in the context of FIGS. 3-6.

The steps above and associated rules may be provided as computer-readable instructions that are executed by one or more processors that are part or, separate from, or in communication with, the package generation system.

Figure 8:
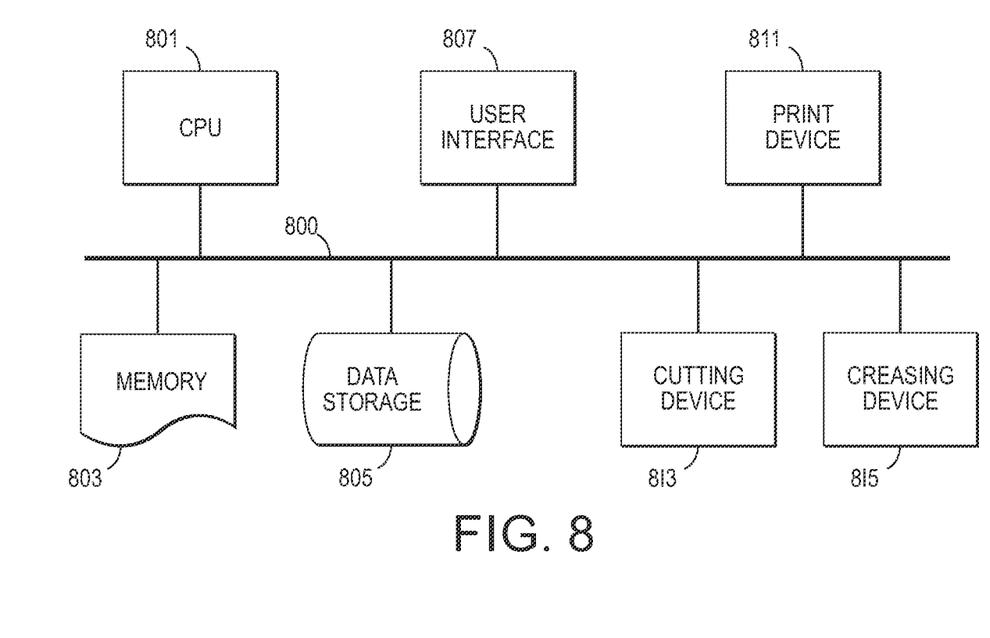
FIG. 8 is a block diagram showing various equipment that may be used to implement various embodiments of the processes described in this document.

FIG. 8 depicts a block diagram of hardware and/or electronics that may make up a package definition and/or production system. One or more communications lines 800 such as a bus or network interconnect the illustrated components and allow data and/or signals to flow between the components. Central processing unit (CPU) 801 is a processor that performs calculations and logic operations required to execute a program. Any number of processors may be available, and they may access a tangible, computer-readable memory device 803 containing programming instructions, along with a data storage facility 805 such as a database that stores the package generation templates and/or rule sets.

A user interface 807 provides output to, and receives input from, a user. The user interface may include a display, audio output, a printer, or another element that provides information to a user. The user interface 807 also may include a touch-sensitive component, microphone, audio port, keyboard, mouse, touch pad, or other input mechanism that is capable of receiving user input.

The system also may include a package generation device, which may include some or all of the following elements: a print device 811, a knife or other cutting device 813, and a roller or other crease application device 815 capable of imparting a crease in a substrate.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method comprising, by one or more processors:
    creating a package design file comprising a two-dimensional representation of a three-dimensional structure having a plurality of facets by:
        defining using one or more processor a plurality of edges for the three-dimensional structure, each edge representing a line along which the three-dimensional structure will be separated from a two dimensional substrate after cut lines and fold lines are applied to the substrate;
        identifying a plurality of facets that are functional elements of the structure, each functional element facet having at least one of the cut line edges;
        identifying an orientation pursuant to which the substrate will pass through a package generation system that will apply the cut lines to the substrate;
        based on the orientation, identifying one or more locations along a cut line edge that will receive a bridge; and
        including each bridge and its corresponding location in the package design file.

2. The method of claim 1, wherein identifying the orientation comprises identifying a leading edge or a trailing edge of the substrate based on a dominant direction of travel of the substrate within the system.

3. The method of claim 2, wherein identifying the one or more locations along the cut line that will receive a bridge comprises identifying a cut line that is a convex cut line.

4. The method of claim 3, wherein identifying a cut that is a convex cut line comprises:
identifying a first facet having a plurality of edges positioned in a plurality of orientations; and
identifying as the convex cut line a portion of one of the first facet's edges that, if no bridge were installed, would be likely to separate from the substrate when the substrate travels within the system in a direction that is opposite the dominant direction of travel.

5. The method of claim 2, wherein identifying the one or more locations along a cut line that will receive a bridge comprises:
identifying a location of the cut line that is closest to the leading edge or furthest from the trailing edge;
determining whether the location is an end of the cut line;
if the location is not an end of the cut line, assigning the bridge to the location; and
if the location is an end of the cut line, determining a distance from the end, and assigning the budge to a position that is the determined distance from the end.

6. The method of claim 2, wherein identifying the one or more locations along a cut line that will receive a bridge comprises:
determining whether the line has a curvature with a deviation that exceeds a threshold;
if the deviation does not exceed the threshold, assigning the bridge to a position along the cut line that is closest to the leading edge; and
if the deviation exceeds the threshold, assigning a plurality of bridges to position along the cut line that are closer to the trailing edge than to the leading edge.

7. The method of claim 1, further comprising:
by the package generation system, accessing the package design file to apply a set of rules that apply the cut lines, fold lines and bridges to the substrate.

8. A method comprising, by one or more processors:
accessing a package design file comprising a two-dimensional representation of a three-dimensional structure having a plurality of facets, wherein the package design file comprises rules that:
define a plurality of edges for the three-dimensional structure, each edge representing a line along which the three-dimensional structure will be separated from a two dimensional substrate after cut lines and fold lines are applied to the substrate; and
identify a plurality of facets that are functional elements of the structure, each functional element facet having at least one of the cut line edges;
identifying an orientation pursuant to which the substrate will pass through a package generation system that will apply the cut lines to the substrate; and
based on the orientation, identifying one or more locations along a cut line edge that will receive a bridge
wherein the method is performed using one or more processor.

9. The method of claim 8, wherein:
identifying the orientation comprises identifying a leading edge or a trailing edge of the substrate based on a dominant direction of travel of the substrate within the package generation system; and
identifying the one or more locations along the cut line that will receive a bridge comprises identifying a cut line that is a convex cut line.

10. The method of claim 9, wherein identifying a cut line that is a convex cut line comprises:
identifying a first facet having a plurality of edges positioned in a plurality of orientations; and
identifying as the convex cut line a portion of one of the first facet's edges that, if no bridge were installed, would be likely to separate from the substrate when the substrate travels within the system in a direction that is opposite the dominant direction of travel.

11. The method of claim 9, wherein identifying the one or more locations along a cut line that will receive a bridge comprises:
identifying a location of the cut line that is closest to the leading edge or furthest from the trailing edge;
determining whether the location is an end of the cut line;
if the location is not an end of the cut line, assigning the bridge to the location; and
if the location is an end of the cut line, determining a distance from the end, and assigning the bridge to a position that is the determined distance from the end.

12. The method of claim 9, wherein identifying the one or more locations along a cut line that will receive a bridge comprises:
determining whether the line has a curvature with a deviation that exceeds a threshold;
if the deviation does not exceed the threshold, assigning the bridge to a position along the cut line that is closest to the leading edge; and
if the deviation exceeds the threshold, assigning a plurality of bridges to positions along the cut line that are closer to the trailing edge than to the leading edge.

13. The method of claim 9, further comprising:
by the package generation system, accessing the package design file to apply a set of rules that apply the cut lines, fold lines and bridges to the substrate.

14. A package generation system, comprising:
a cutting device;
a processor;
a data storage facility containing a package design file comprising a two-dimensional representation of a three-dimensional structure having a plurality of facets, wherein the package design file comprises rules that:
define a plurality of edges for the three-dimensional structure, each edge representing a line along which the three-dimensional structure will be separated from a two dimensional substrate after cut lines and fold lines are applied to the substrate, and
identify a plurality of facets that are functional elements of the structure, each functional element facet having at least one of the cut line edges; and
a non-transitory computer-readable medium containing programming instructions that are configured to, upon execution, instruct the processor to access the package design file and apply one or more of the rules of the package design file to:
identify an orientation pursuant to which the substrate will pass through the package generation system,
based on the orientation, identify a location along a cut line edge that will receive a bridge, and
cause the cutting device to apply a cut line with the bridge to the substrate at the identified location.

15. The system of claim 4, further comprising:
a creasing device;

wherein the package design file also comprises rules that define locations for a plurality of fold lines for the substrate; and wherein the programming instructions are also configured to, upon execution, instruct the processor to access the package design file and apply one or more of the rules of the package design file to cause the creasing device to apply the fold lines to the substrate at the defined locations for the fold lines.

16. The system of claim 14, wherein the instructions that are configured to instruct the processor to identify an orientation pursuant to which the substrate will pass through the package generation system comprise instructions to identifying a leading edge or a trailing edge of the substrate based on a dominant direction of travel of the substrate within the package generation system.

17. The system of claim 16, wherein the instructions that are configured to instruct the processor to identify a location along a cut line edge that will receive a bridge comprise instructions to identify a cut line that is a convex cut line.

18. The system of claim 17, wherein the instructions to identify a cut line that is a convex cut line comprise instructions to:
   identify a first facet having a plurality of edges positioned in a plurality of orientations; and
   identify as the convex cut line a portion of one of the first facet's edges that, if no bridge were installed, would be likely to separate from the substrate when the substrate travels within the system in a direction that is opposite the dominant direction of travel.

19. The system of claim 16, wherein the instructions to identify the location along a cut line that will receive a bridge comprise instructions to:
   identify a location of the cut line that is closest to the leading edge or furthest from the trailing edge;
   determine whether the location is an end of the cut line;
   if the location is not an end of the cut line, assign the bridge to the location; and
   if the location is an end of the cut line, determine a distance from the end, and assign the bridge to a position that is the determined distance from the end.

20. The system of claim 16, wherein the instructions to identify the one or more locations along a cut line that will receive a bridge comprise instructions to:
   determine whether the line has a curvature with a deviation that exceeds a threshold;
   if the deviation does not exceed the threshold, assign the bridge to a position along the cut line that is closest to the leading edge; and
   if the deviation exceeds the threshold, assign a plurality of bridges to positions along the cut line that are closer to the trailing edge than to the leading edge.

* * * * *